(12) United States Patent
Gao et al.

(10) Patent No.: US 12,729,947 B2
(45) Date of Patent: Sep. 8, 2026

(54) BUILT-IN GAP MEASURING DEVICE AND GAP MEASUREMENT METHOD

(71) Applicant: CHINA THREE GORGES CORPORATION, Wuhan (CN)

(72) Inventors: Chao Gao, Wuhan (CN); Zhiwei Wang, Wuhan (CN); Jie Yu, Wuhan (CN); Qi Yu, Wuhan (CN); Yuxin Li, Wuhan (CN); Jianshu Ouyang, Wuhan (CN)

(73) Assignee: CHINA THREE GORGES CORPORATION (CN)

(*) Notice: Subject to any disclaimer, the term of this patent is extended or adjusted under 35 U.S.C. 154(b) by 416 days.

(21) Appl. No.: 18/369,688

(22) Filed: Sep. 18, 2023

(65) Prior Publication Data

US 2024/0102788 A1 Mar. 28, 2024

(30) Foreign Application Priority Data

Sep. 27, 2022 (CN) ......................... 202211186559.9

(51) Int. Cl.
*G01B 7/14* (2006.01)
*G01B 5/00* (2006.01)
*G01B 7/16* (2006.01)

(52) U.S. Cl.
CPC ............ *G01B 7/14* (2013.01); *G01B 5/0004* (2013.01); *G01B 7/16* (2013.01)

(58) Field of Classification Search
CPC ... G01B 5/00; G01B 7/14; G01B 7/16; G01B 5/0004; G01B 7/02; F16M 11/24
See application file for complete search history.

(56) References Cited

U.S. PATENT DOCUMENTS

| | | | | |
|---|---|---|---|---|
| 4,654,989 A * | 4/1987 | Fleming | G09F 7/02 | 40/579 |
| 4,876,758 A * | 10/1989 | Rolloff | A43B 7/28 | 600/592 |
| 5,796,620 A * | 8/1998 | Laskowski | G05B 19/4207 | 700/118 |
| 6,298,587 B1 * | 10/2001 | Vollom | G01B 5/207 | 33/561.1 |

(Continued)

FOREIGN PATENT DOCUMENTS

| | | | |
|---|---|---|---|
| CN | 114776957 A * | 7/2022 | H02M 7/003 |
| CN | 114704119 B * | 8/2022 | E04G 23/0203 |

*Primary Examiner* — Peter J Macchiarolo
*Assistant Examiner* — Anna Josephine Saunders

(57) ABSTRACT

The present disclosure relates to the technical field of surveying and mapping building structures, in particular to a built-in gap measuring device and a gap measurement method. The built-in gap measuring device includes an adjustment mechanism and measuring mechanisms disposed on both sides of the adjustment mechanism. The adjustment mechanism can adjust the distance between two groups of measuring mechanisms, and the measuring mechanism includes a panel structure and a measuring column. The panel structure includes a bottom cover close to the adjustment mechanism and a top cover away from the adjustment mechanism. A plurality of rows of elastic column holes are arranged on the top cover in array, column seats in one-to-one correspondence with elastic column holes are arranged inside the panel structure in array.

16 Claims, 13 Drawing Sheets

(56) References Cited

U.S. PATENT DOCUMENTS

| | | | | |
|---|---|---|---|---|
| 6,633,416 | B1 * | 10/2003 | Benson | G06F 3/002 358/478 |
| 6,742,202 | B2 * | 6/2004 | Jones | A47C 19/005 5/722 |
| 6,860,784 | B2 * | 3/2005 | Chernov | G09B 25/00 40/427 |
| 7,654,021 | B2 * | 2/2010 | Kleyman | G01B 5/207 33/561.1 |
| 12,017,387 | B2 * | 6/2024 | Tran | B33Y 80/00 |
| 2024/0102788 | A1 * | 3/2024 | Gao | G01B 5/0004 |

* cited by examiner

BUILT-IN GAP MEASURING DEVICE AND GAP MEASUREMENT METHOD

CROSS-REFERENCE TO RELATED APPLICATION

This application claims priority from the Chinese patent application 202211186559.9 filed Sep. 27, 2022, the content of which is incorporated herein in the entirety by reference.

TECHNICAL FIELD

The present disclosure relates to the technical field of surveying and mapping building structures, in particular to a built-in gap measuring device and a gap measurement method.

BACKGROUND

Structural gaps are commonly found in civil engineering, and industrial and civil buildings. The gaps can be roughly divided into two types, one type is cracks caused by structural overstressing destruction, such as structural cracks, brittle fracture cracks, settlement cracks and so on; the other type is construction gaps, which are specially preset gaps necessary for construction, such as seismic gaps and temperature expansion joints in modern construction, and gaps reserved between mortise and tenon nodes for easy installation in traditional wood frame construction. Although some gaps are necessary for building structure, potential safety risks occurring to the structure will be caused by the existence of gaps, especially the potential safety hazards under the action of earthquakes, such as beam-column nodes, when there are gaps in the nodes, the stiffness and bearing capacity of the joints will be greatly reduced.

In order to analyze the mechanical properties of the beam-column joint with gaps, it is necessary to find out the actual sizes of the gaps, or at least obtain the maximum size. It is difficult to measure the gap between beam-column joints, at present, a ruler is mostly used for direct measurement at the outer edge of the gap, ignoring changes in gap width. However, more complex internal structure of the gap is common, such as honeycomb hemp surface, thus the width value of the outer edge of the gap cannot represent the internal width of the gap, so the current simplified measurement often cannot accurately reflect the actual width of the gap.

SUMMARY

Therefore, the technical problem to be solved by the present disclosure is to overcome the defect of the prior art that can not accurately measure the actual width of the gap, so as to provide a built-in gap measuring device and a gap measurement method capable of accurately measuring the actual width of the gap.

In order to solve the above technical problem, the present disclosure provides a built-in gap measuring device, comprising an adjustment mechanism and measuring mechanisms disposed on both sides of the adjustment mechanism, wherein the adjustment mechanism can adjust the distance between two groups of the measuring mechanisms, and the measuring mechanism includes a panel structure and a measuring column; the panel structure includes a bottom cover close to the adjustment mechanism and a top cover away from the adjustment mechanism, a plurality of rows of elastic column holes are arranged on the top cover in array, column seats in one-to-one correspondence with the elastic column holes are arranged inside the panel structure in array, the first end of the column seat is fixed on the bottom cover, the second end of the column seat is positioned inside the elastic column hole and is flush with the outer surface of the top cover; the measuring column includes an elastic column, a spring, a piezoelectric material and a control circuit board, the elastic column includes a column body, a column cap and a ring seat, the column body is a hollow structure and encircles the outside of the column seat, the ring seat is connected to one end of the column body and is slidably set around the outside of the column seat, the outer diameter of the ring seat is larger than the outer diameter of the elastic column hole, the column cap is disposed at the other end of the column body, the piezoelectric material is disposed inside the column body and abuts against the second end of the column seat, the spring is disposed inside the column body, one end of the spring abuts against the piezoelectric material, and the other end of the spring abuts against the column cap, when the elastic column is not subjected to an external force, the spring is in a naturally-elongated state, and the control circuit board is disposed on the panel structure and electrically connected with each piezoelectric material.

Optionally, a first fixing groove is disposed at the center of the outer surface of the bottom cover, and the control circuit board is embedded in the first fixed groove.

Optionally, two first support seats are symmetrically arranged at one end of the outer surface of the bottom cover, a shaft hole is disposed on the first support seat, two slideways are symmetrically arranged at the other end of the outer surface of the bottom cover, the adjustment mechanism includes a first support, a support and a driving structure, the first support includes a first body, a first shaft disposed at the first end of the first body, and two first sliding blocks disposed at the second end of the first body, the first shaft is articulated in two shaft holes on one of the bottom covers, and the two first sliding blocks are respectively disposed in the two slideways on the other bottom cover; the second support includes a second body, a first shaft disposed at the first end of the second body, and two second sliding blocks disposed at the second end of the second body, the second shaft is articulated in two shaft holes on the bottom covers having the first sliding block, and the two second sliding blocks are respectively disposed in the two slideways on the other bottom cover articulated with the first shaft, the middle part of the second body is articulated with the middle part of the first body through a main shaft, the first shaft and the second shaft are positioned on the same side of the main shaft; the driving structure is capable of driving the first support and the second support to rotate around the main shaft.

Optionally, one end of the slideway is flush with the end of the bottom cover, the slideway is T-shaped, correspondingly, the first sliding block and the second sliding block include a T-shaped key.

Optionally, a first shaft sleeve is disposed at the middle part of the first body, a second shaft sleeve is disposed at the middle part of the second body, the main shaft passes through the first shaft sleeve and the second shaft sleeve and its both ends are connected with an end cap.

Optionally, two connecting shafts are symmetrically arranged on the second end of the first body at intervals, the length of the connecting shaft is less than the length of the first shaft, a second fixing groove is disposed on one end of the bottom cover, the driving structure includes a support seat, a lead screw, a motor assembly and a screw nut assembly, two support seats are arranged at intervals, and fixed on the outer surface of one of the bottom covers, and a connecting hole is set on the support seat; the two ends of the lead screw can be rotationally disposed inside the connecting hole; the motor assembly is connected to one end of the lead screw, and the motor assembly is fixed inside the second fixing groove of the bottom cover fixedly connected with the support seat; the screw nut assembly is disposed on the lead screw and connected with it by means of a threaded fit between them, and the two sides of the screw nut assembly are rotationally connected with the connecting shaft, respectively.

Optionally, the screw nut assembly includes a ball screw nut, a screw nut connector and a bearing, the screw ball nut is disposed on the lead screw by means of a thread fit between them; two screw nut connectors are symmetrically arranged on both sides of the ball screw nut, one end of the screw nut connector facing the ball screw nut is a curved surface that fits the contour of the ball screw nut, the ball screw nut is embedded in the curved surface and is fixedly connected to the screw nut connector, and one end of the nut screw connector back-facing the ball screw nut is provided with a bearing hole; the bearing is arranged in one-to-one correspondence with the screw nut connector, the outer ring of the bearing is fixedly with the bearing hole, and the inner ring of the bearing is fixed outside the connecting shaft.

Optionally, the connecting shaft includes a first shaft segment and a second shaft segment, the outer diameter of the second shaft segment is less than the outer diameter of the first shaft segment, and the second shaft segment is fixedly connected with the inner ring of the bearing.

Optionally, the panel structure includes a main panel and a plurality of expansion panels, the main panel is rectangular, the expansion panel is rectangular or triangular, the measuring column is disposed on each of the main panel and the expansion panel, the slideway is disposed on the main panel, the second fixing groove extends to one of the side walls of the main panel, first splicing notches are disposed on the other side walls of the main panel, a second splicing notch corresponding to the first splicing notch is disposed on the side wall of the extension panel, the first splicing notch and the second splicing notch are both dovetail-shaped, and aligned with each other to be symmetrically arranged with respect to their splicing face, the main panel and the expansion panel are connected by a splicing connector, which may be simultaneously embedded in the first splicing notch and the second splicing notch.

The present disclosure also provides a gap measurement method applied to the built-in gap measuring device, comprising the steps of S1. adjusting the adjustment mechanism, so as to enable the distance between the two panel structures to reach a minimum value;

S2. embedding the built-in gap measuring device into the gap to be measured; and S3. adjusting the adjustment mechanism, so as to enable the distance between the two panel structures to increase until an electrical signal is generated from each the piezoelectric material.

The technical solution of the present disclosure has the following advantages:

As for the built-in gap measuring device provided by the present disclosure, when it is necessary to measure the gap width, firstly adjust the adjustment mechanism, so as to enable the distance between the two panel structures to reach a minimum value, that is, enable the distance between the two bottom covers to reach a minimum value; then embed the built-in gap measuring device into the gap to be measured; next adjust the adjustment mechanism, so as to enable the distance between the two panel structures to increase until an electrical signal is generated from each piezoelectric material. Specifically, when the distance between the two panel structures increases, as the protruding areas exist on the gap side wall, some elastic columns are squeezed due to contact with the gap side wall, at this time, the spring inside the elastic column is squeezed under the load, so that the piezoelectric material is pressed to generate an electrical signal; the distance between the two panel structures continues to increase, and the elastic column is capable of contacting the dented area of the gap side wall and generates an electrical signal, until each piezoelectric material generates an electrical signal; after each piezoelectric material has generated an electrical signal, the adjustment mechanism stops operating, each piezoelectric material generating an electrical signal denotes that each elastic column has been in contact with the gap side wall, but the spring is squeezed to different degrees, correspondingly the piezoelectric material generates electrical signals with different values. Therefore, the degrees of protrusion or indentation of the gap side wall and the displacement distance of the elastic column arising from squeezes can be determined according to the electrical signal value generated from each piezoelectric material, and then the length of the elastic column finally extending from the panel structure can be obtained according to the length of the elastic column initially extending from the panel structure minus the displacement distance of the elastic column arising from squeezes, next the actual width of the gap can be obtained according to the distance between the two panel structures plus the thickness of the two panel structures and the length value of the two opposite elastic columns finally extending from the panel structure, in this way the built-in gap measuring device can accurately measure the actual width of the gap.

BRIEF DESCRIPTION OF THE DRAWINGS

To describe the embodiments of the present disclosure or the technical solutions in the prior art more clearly, the following briefly introduces the accompanying drawings required for describing the embodiments or the descriptions in the prior art. Apparently, the accompanying drawings in the following description show merely some embodiments of the present disclosure, and a person of ordinary skill in the art may still derive other drawings from these accompanying drawings without creative efforts.

Figure 1:
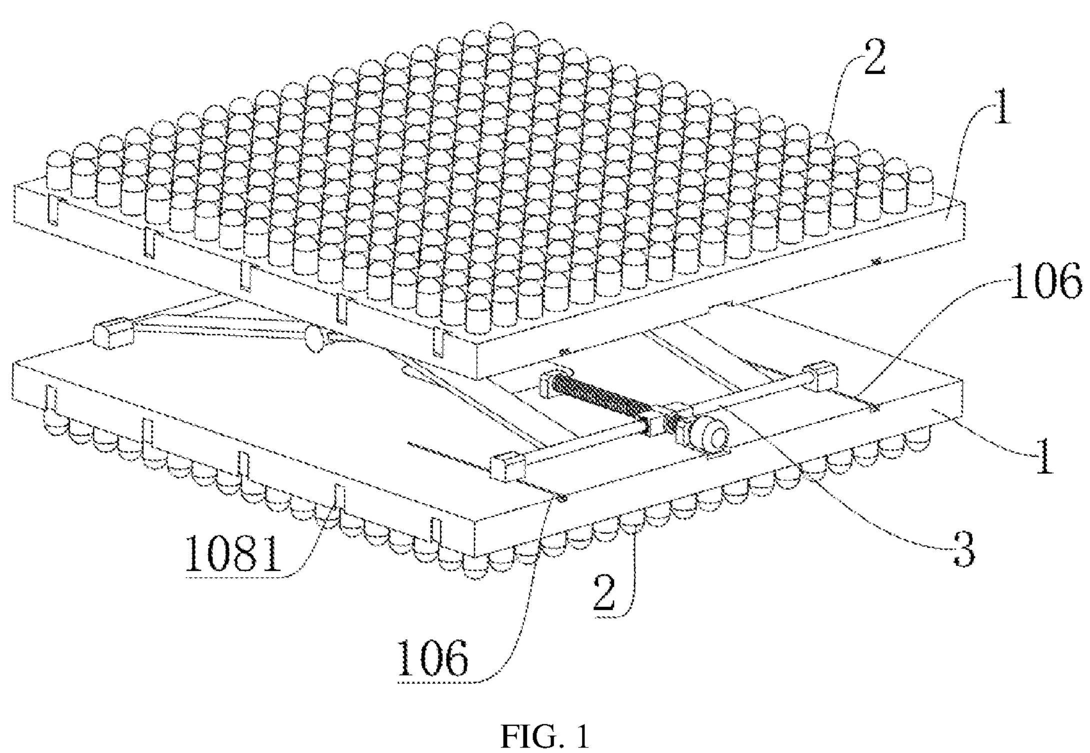
FIG. 1 is a structure diagram of the built-in gap measuring device in Example 1 of the present disclosure.

Where, 1—panel structure; 101—bottom cover; 102—top cover; 1021—elastic column hole; 103—column seat; 104—first fixing groove; 105—first support seat; 1051—shaft hole; 106—slideway; 107—second fixing groove; 108—main panel; 1081—first splicing notches; 109—expansion panel; 1091—second splicing notch; 110—splicing connector; 2—measuring column; 201—elastic column; 2011—column body; 2012—column cap; 2013—ring seat; 202—spring; 203—piezoelectric material; 204—control circuit board; 3—adjustment mechanism; 301—first support; 3011—first body; 30111—first shaft sleeve; 3012—first shaft; 3013—first sliding block; 30131—T-shaped key; 3014—connecting shaft; 30141—first shaft segment; 30142—second shaft segment; 302—second support; 3021—second body; 30211—second shaft sleeve; 3022—second shaft; 3023—second sliding block; 3024—third shaft; 303—main shaft; 3031—end cap; 304—driving structure; 3041—support seat; 30411—connecting hole; 3042—lead screw; 3043—motor assembly; 30431—second support seat; 30432—motor; 3044—screw nut assembly; 30441—ball screw nut; 30442—screw nut connector; 304421—bearing hole; 30443—bearing.

DETAILED DESCRIPTION OF SOME EMBODIMENTS

The technical solutions in the embodiments of the present disclosure will be clearly and completely described as follows in combination with the drawings in the examples of the present disclosure, but obviously, the described examples are only a part of the embodiments of the present disclosure, rather than all the embodiments. Based on the examples of the present disclosure, all other examples obtained by a person skilled in the art without creative efforts shall fall within the protection scope of the present disclosure.

Furthermore, the technical features involved in different embodiments of the present disclosure described as follows can be combined with each other as long as they do not conflict with each other.

Example 1

Structural gaps are commonly found in civil engineering, and industrial and civil buildings. The gaps can be roughly divided into two types, one type is cracks caused by structural overstressing destruction, such as structural cracks, brittle fracture cracks, settlement cracks and so on; the other type is construction gaps, which are specially preset gaps necessary for construction, such as seismic gaps and temperature expansion joints in modern construction, and gaps reserved between mortise and tenon nodes for easy installation in traditional wood frame construction. Although some gaps are necessary for building structure, potential safety risks occurring to the structure will be caused by the existence of gaps, especially the potential safety hazards under the action of earthquakes, such as beam-column nodes, when there are gaps in the nodes, the stiffness and bearing capacity of the joints will be greatly reduced.

In order to analyze the mechanical properties of the beam-column joint with gaps, it is necessary to find out the actual sizes of the gaps, or at least obtain the maximum size. It is difficult to measure the gap between beam-column joints, at present, a ruler is mostly used for direct measurement at the outer edge of the gap, ignoring changes in gap width. However, more complex internal structure of the gap is common, such as honeycomb hemp surface, thus the width value of the outer edge of the gap cannot represent the internal width of the gap, so the current simplified measurement often cannot accurately reflect the actual width of the gap.

Therefore, as shown in FIGS. 1-18, this example provides a built-in gap measuring device.

In an embodiment, the built-in gap measuring device includes the adjustment mechanism 3 and measuring mechanisms disposed on both sides of the adjustment mechanism 3. The adjustment mechanism 3 can adjust the distance between two groups of measuring mechanisms, and the measuring mechanism includes the panel structure 1 and the measuring column 2.

The panel structure 1 includes the bottom cover 101 close to the adjustment mechanism 3 and the top cover 102 away from the adjustment mechanism 3. A plurality of rows of elastic column holes 1021 are arranged on the top cover 102 in array, the column seats 103 in one-to-one correspondence with the elastic column holes 1021 are arranged inside the panel structure 1 in array, the first end of the column seat 103 is fixed on the bottom cover 101, the second end of the column seat 103 is positioned inside the elastic column hole 1021 and is flush with the outer surface of the top cover 102, the measuring column 2 includes the elastic column 201, the spring 202, the piezoelectric material 203 and the control circuit board 204, the elastic column 201 includes the column body 2011, the column cap 2012 and the ring seat 2013, the column body 2011 is a hollow structure and encircles the outside of the column seat 103, the ring seat 2013 is connected to one end of the column body 2011 and is slidably set around the outside of the column seat 103, the outer diameter of the ring seat 2013 is larger than the outer diameter of the elastic column hole 1021, the column cap 2012 is disposed at the other end of the column body 2011, the piezoelectric material 203 is disposed inside the column body 2011 and abuts against the second end of the column seat 103, the spring 202 is disposed inside the column body 2011, one end of the spring 202 abuts against the piezoelectric material 203, and the other end of the spring 202 abuts against the column cap 2012. When the elastic column 201 is not subjected to an external force, the spring 202 is in a naturally-elongated state, and the control circuit board 204 is disposed on the panel structure 1 and electrically connected with each piezoelectric material 203.

In this embodiment, when it is necessary to measure the gap width, firstly adjust the adjustment mechanism 3, so as to enable the distance between the two panel structures 1 to reach a minimum value, that is, enable the distance between the two bottom covers 101 to reach a minimum value; then embed the built-in gap measuring device into the gap to be measured; next adjust the adjustment mechanism 3, so as to enable the distance between the two panel structures 1 to increase until an electrical signal is generated from each piezoelectric material 203. Specifically, when the distance between the two panel structures 1 increases, as the protruding areas exist on the gap side wall, some elastic columns 201 are squeezed due to contact with the gap side wall, at this time, the spring 202 inside the elastic column 201 is squeezed under the load, so that the piezoelectric material 203 is pressed to generate an electrical signal; the distance between the two panel structures 1 continues to increase, and the elastic column 203 is capable of contacting the dented area of the gap side wall and generates an electrical signal, until each piezoelectric material 203 generates an electrical signal; after each piezoelectric material 203 has generated an electrical signal, the adjustment mechanism 3 stops operating, each piezoelectric material 203 generating an electrical signal denotes that each elastic column 201 has been in contact with the gap side wall, but the spring 202 is squeezed to different degrees, correspondingly the piezoelectric material 203 generates electrical signals with different values. Therefore, the degrees of protrusion or indentation of the gap side wall and the displacement distance of the elastic column 201 arising from squeezes can be determined according to the electrical signal value generated from each piezoelectric material 203, and then the length of the elastic column 201 finally extending from the panel structure 1 can be obtained according to the length of the elastic column 201 initially extending from the panel structure 1 minus the displacement distance of the elastic column 201 arising from squeezes, next the actual width of the gap can be obtained according to the distance between the two panel structures 1 plus the thickness of the two panel structures 1 and the length value of the two opposite elastic columns 201 finally extending from the panel structure 1, in this way the built-in gap measuring device can accurately measure the actual width of the gap.

It should be noted that the relation between the deformation value of the elastic column 201 and the electrical signal value fed back from the piezoelectric material 203 can be determined in advance according to the experiment, so at the time of actually measuring the gap width, the deformation value of the elastic column 201 can be determined according to the electrical signal value fed back from the piezoelectric material 203, that is, the displacement distance of the elastic column 201, and then the degrees of protrusion or indentation of the gap are determined.

It should be noted that the distance between the two panel structures 1 can be measured outside the gap, or it can be determined according to the operation duration of the adjustment mechanism 3 when each piezoelectric material generates an electrical signal.

Figure 2:
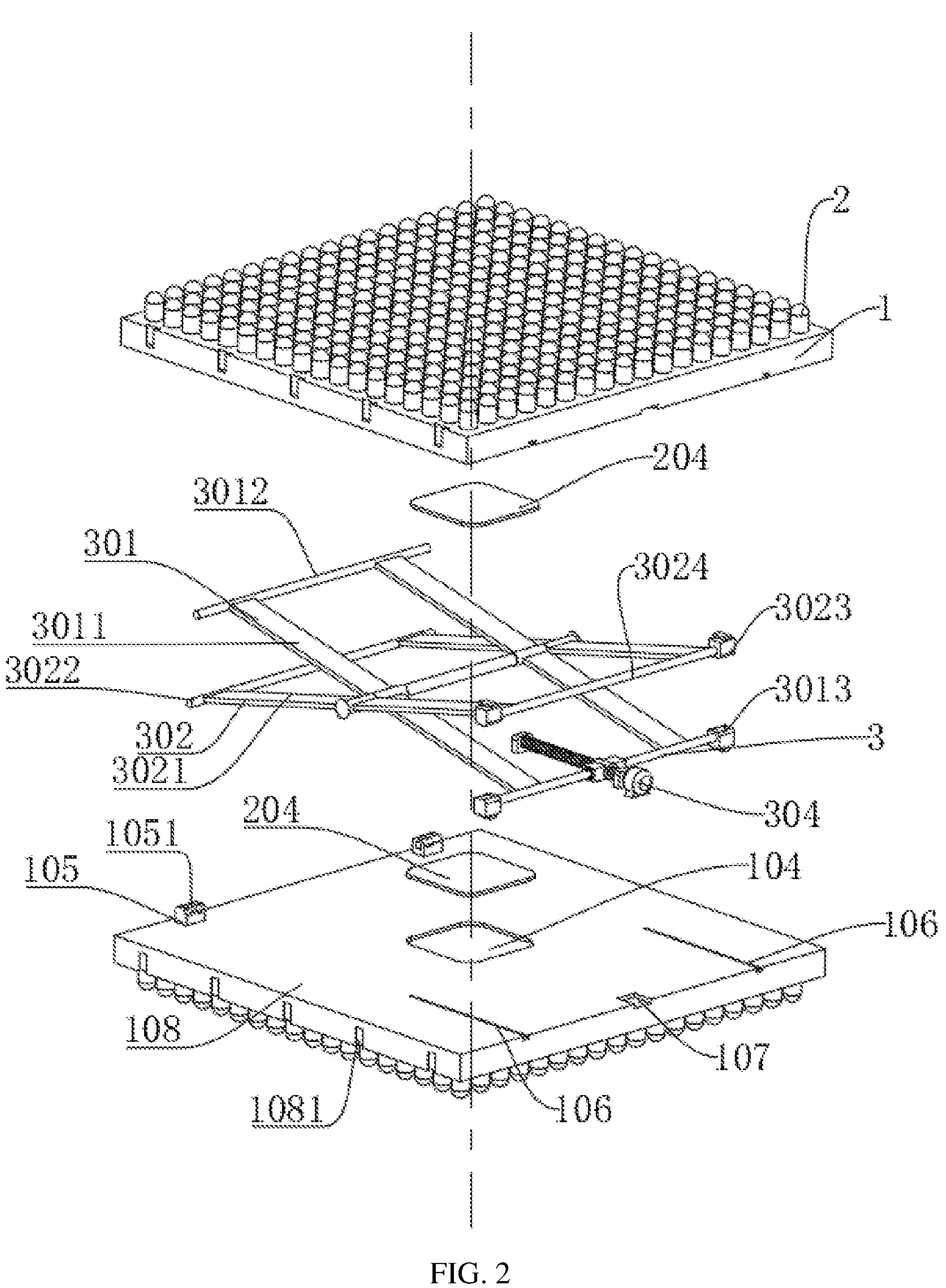
FIG. 2 is an exploded view of the built-in gap measuring device shown in FIG. 1.
Figure 3:
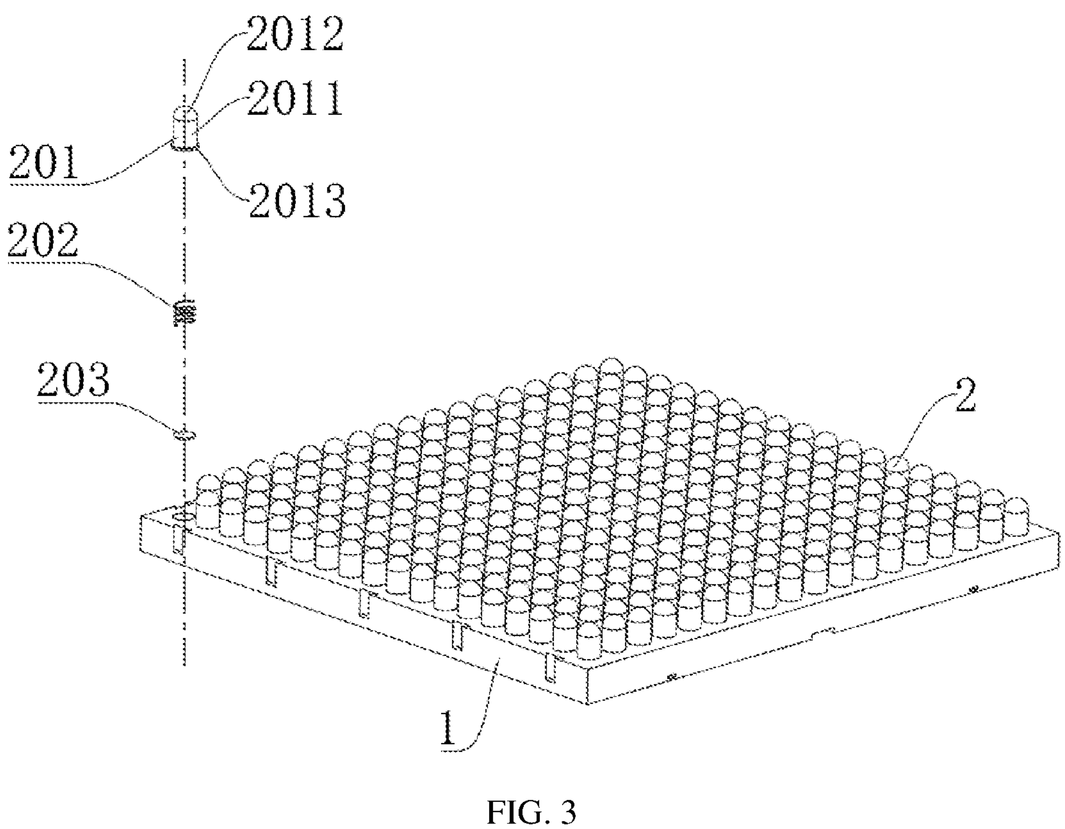
FIG. 3 is a structure diagram at the time of separating the measuring column from the panel structure shown in FIG. 2.
Figure 4:
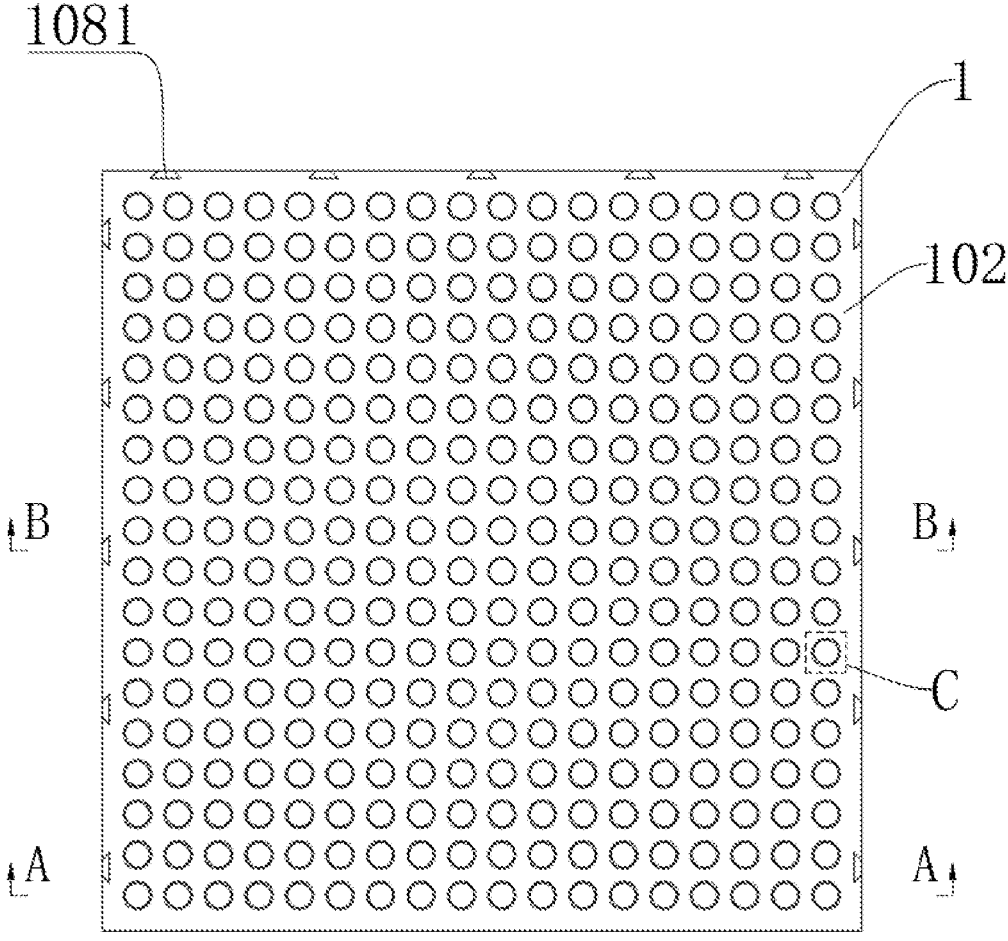
FIG. 4 shows a top view of the panel structure.
Figure 5:
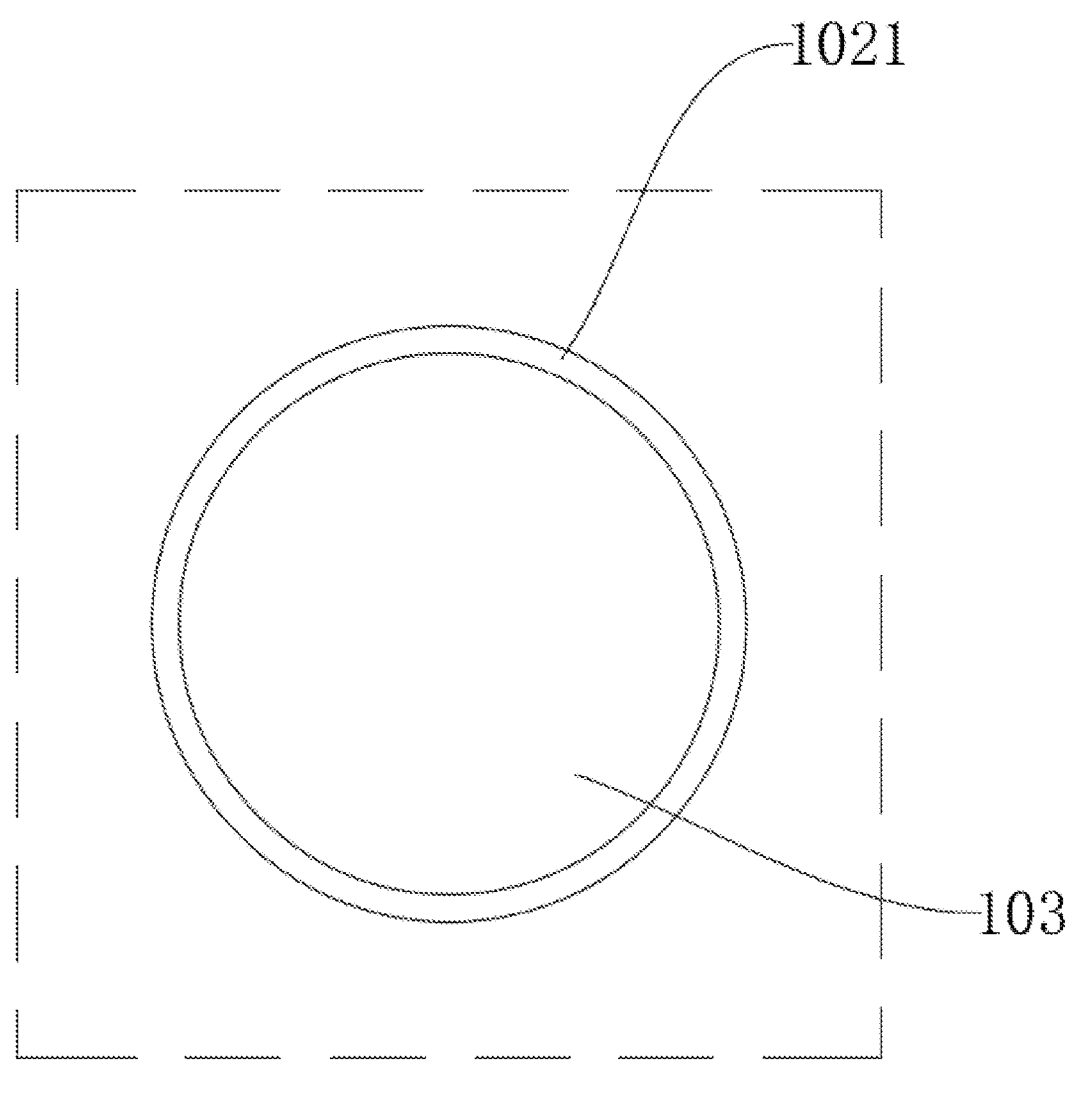
FIG. 5 is an enlarged view at C in FIG. 4.
Figure 6:
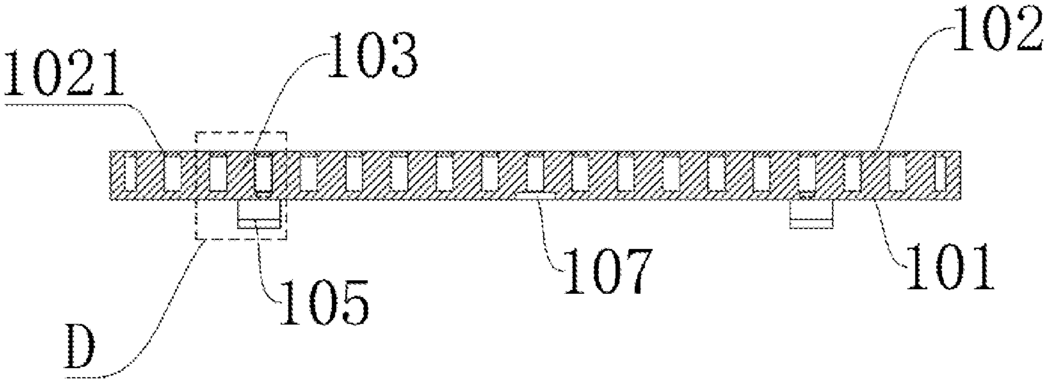
FIG. 6 is a cross-sectional view at A-A of FIG. 4.
Figure 7:
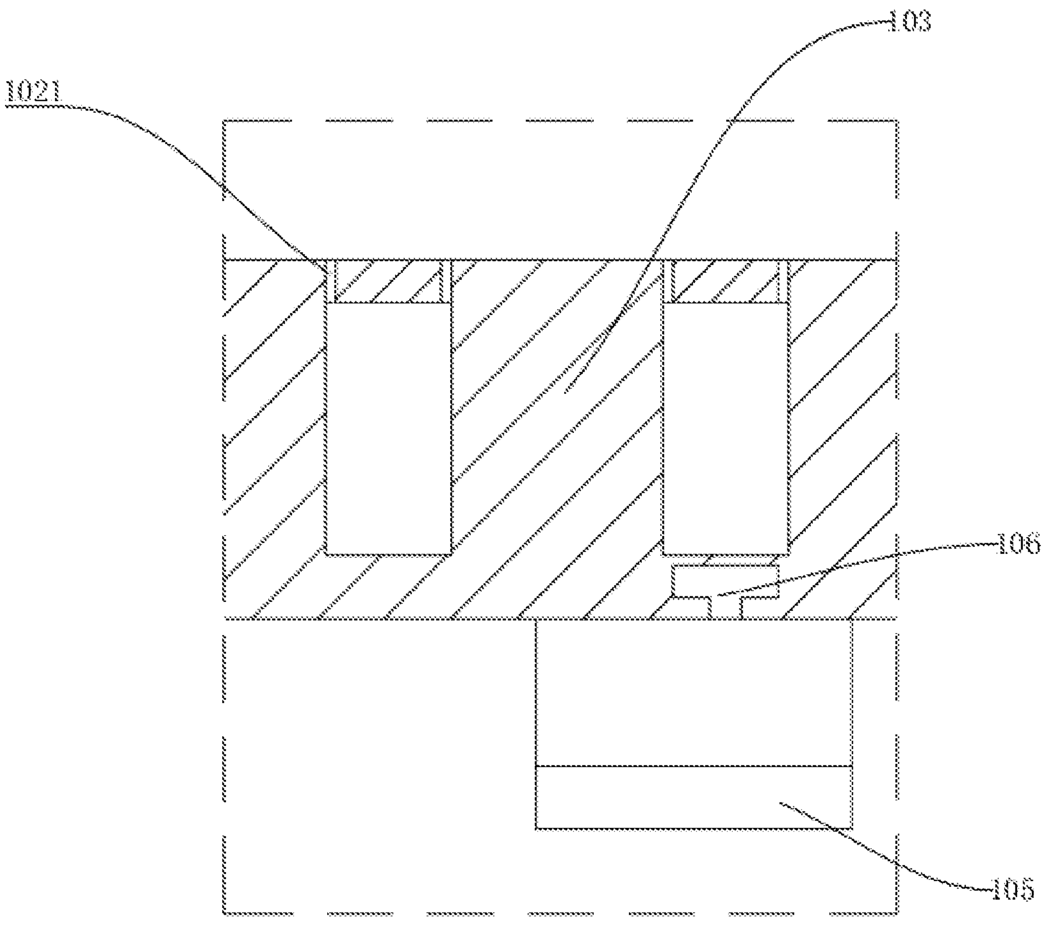
FIG. 7 is an enlarged view at D in FIG. 6.
Figure 8:
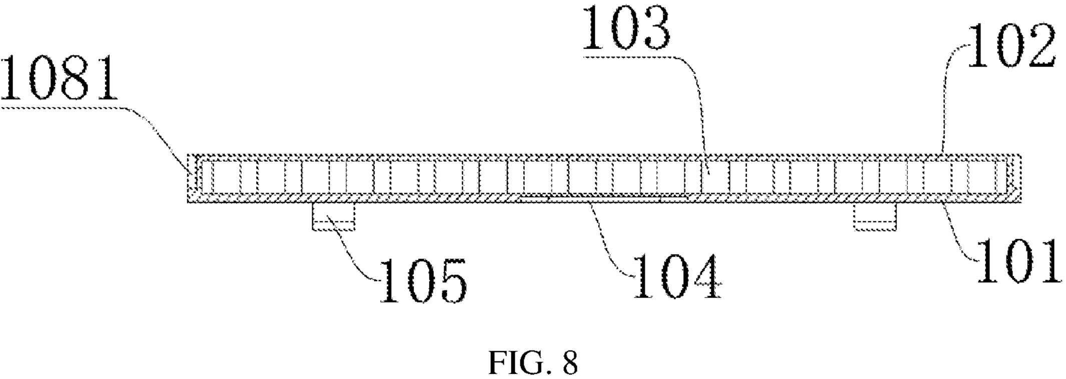
FIG. 8 is a cross-sectional view at B-B of FIG. 4.

On the basis of the above embodiment, in a preferred embodiment, as shown in FIG. 2, the first fixing groove 104 is disposed at the center of the outer surface of the bottom cover 101, and the control circuit board 204 is embedded in the first fixed groove 104. In this embodiment, the control circuit board 204 is embedded in the first fixing groove 104, on the one hand, that is convenient for the installation and fixing of the control circuit board 204, and on the other hand, the appearance is neater and more beautiful. Of course, in an alternative embodiment, there may be no first fixing groove 104, so the control circuit board 204 is directly stuck on the bottom cover 101 by screws or glue.

On the basis of the above embodiment, in a preferred embodiment, further referring to FIG. 2, two first support seats 105 are symmetrically arranged at one end of the outer surface of the bottom cover 101, the shaft hole 1051 is disposed on the first support seat 105, two slideways 106 are symmetrically arranged at the other end of the outer surface of the bottom cover 101, the adjustment mechanism 3 includes the first support 301, the support 302 and the driving structure 304. Wherein, the first support 301 includes the first body 3011, the first shaft 3012 disposed at the first end of the first body 3011, and two first sliding blocks 3013 disposed at the second end of the first body 3011, the first shaft 3012 is articulated in two shaft holes 1051 on one of the bottom covers 101, and the two first sliding blocks 3013 are respectively disposed in the two slideways 106 on the other bottom cover 101; the second support 302 includes the second body 3021, the second shaft 3022 disposed at the first end of the second body 3021, and two second sliding blocks 3023 disposed at the second end of the second body 3021, the second shaft 3022 is articulated in two shaft holes 1051 on the bottom covers 101 having the first sliding block 3013, and the two second sliding blocks 3023 are respectively disposed in the two slideways 106 on the other bottom cover 101 articulated with the first shaft 3012, the middle part of the second body 3021 is articulated with the middle part of the first body 3011 through the main shaft 303, the first shaft 3012 and the second shaft 3022 are positioned on the same side of the main shaft 303; the driving structure 304 is capable of driving the first support 301 and the second support 302 to rotate around the main shaft 303. In this embodiment, the adjustment mechanism 3 is specifically presented as that: the driving structure 304 controls the first support 301 and the second support 302 to rotate around the main shaft 303, when the first shaft 3012 and the second shaft 3022 are close to each other, the first sliding block 3013 and the second sliding block 3023 slide towards the edge of the panel structure 1 in the slideway 106, so that the distance between the two panel structures 1 decreases, when the first shaft 3012 and the second shaft 3022 are away from each other, the first sliding block 3013 and the second sliding block 3023 slide towards the center of the panel structure 1 in the slideway 106, so that distance between the two panel structures 1 increases. In an alternative embodiment, the adjustment mechanism 3 may include an air cushion, the air cushion has an air inlet, inflating the air cushion enables the air cushion to unfold, thereby achieving an increase in the distance between the two panel structures 1, and squeezing the air cushion to deflate it enables the distance between the two panel structures 1 to decrease.

Figure 9:
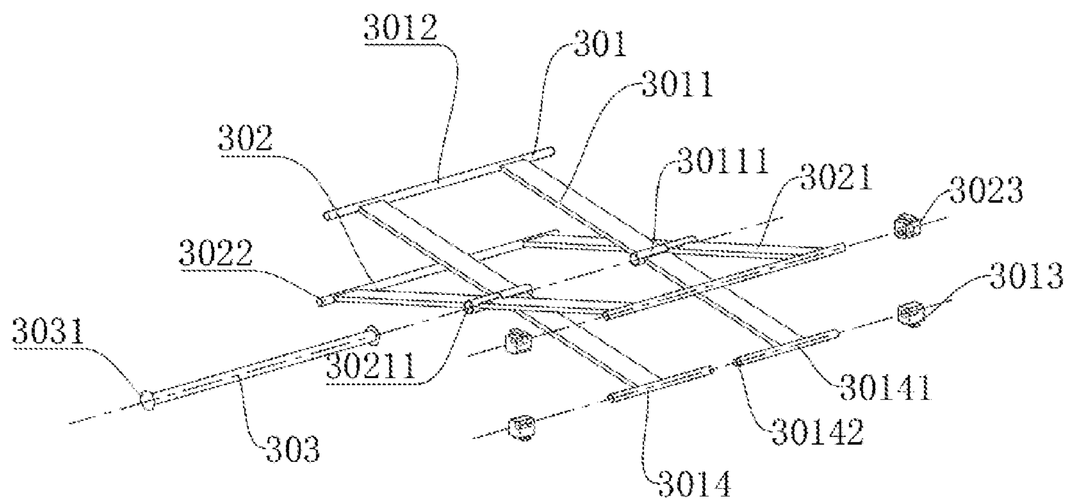
FIG. 9 is an exploded view of the first support and the second support.
Figure 10:
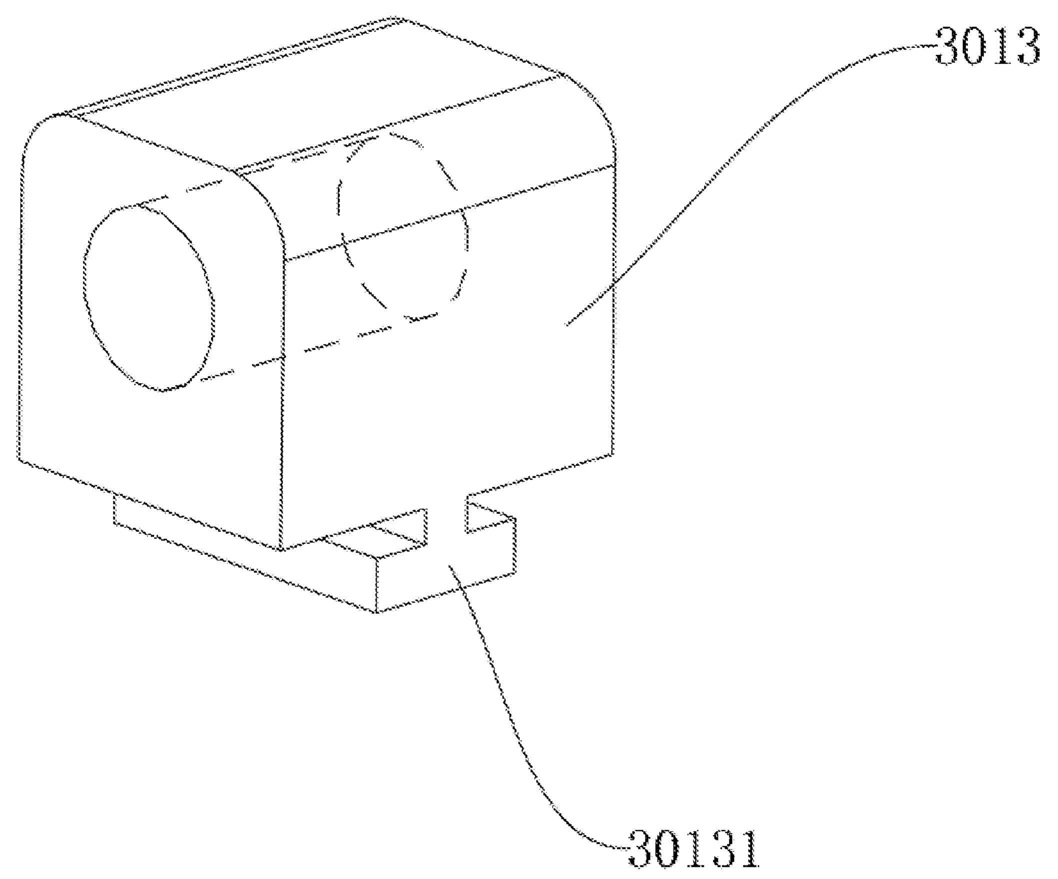
FIG. 10 is an enlarged view of the first sliding block in FIG. 9.

As shown in FIGS. 2 and 9, the first body 3011 includes two long flat first rods, the first shaft 3012 is connected at the identical ends of the two first rods, and the connecting shaft 3014 is connected at the other ends of the two first rods. The second body 3021 includes two long flat second rods, the second shaft 3022 is connected at the identical ends of the two second rods, and the third shaft 3024 is connected at the other ends of the two second rods, the length of the third shaft 3024 is consistent with the length of the second shaft 3022. In an alternative embodiment, the first body 3011 or the second body 3021 may be a plate-shaped part.

On the basis of the above embodiment, in a preferred embodiment, one end of the slideway 106 is flush with the end of the bottom cover 101, the slideway 106 is T-shaped, correspondingly, the first sliding block 3013 and the second sliding block 3023 include a T-shaped key 30131. In this embodiment, since one end of the slideway 106 is flush with the end of the bottom cover 101, it is convenient for the first sliding block 3013 and the second sliding block 3023 to be assembled into the slideway 106, since the slideway 106 is T-shaped, the first sliding block 3013 and the second sliding block 3023 may be prevented from coming out of the slideway 106.

On the basis of the above embodiment, in a preferred embodiment, further referring to FIG. 9, the first shaft sleeve 30111 is disposed at the middle part of the first body 3011, the second shaft sleeve 30211 is disposed at the middle part of the second body 3021, the main shaft 303 passes through the first shaft sleeve 30111 and the second shaft sleeve 30211 and its both ends are connected with the end cap 3031. In this embodiment, the first body 3011 and the second body 3021 are relatively simply connected with each other. Wherein the inner diameter of the first shaft sleeve 30111 is fully consistent with the inner diameter of the second shaft sleeve 30211, both the first body 3011 and the second body 3021 can rotate relative to the main shaft 303.

On the basis of the above embodiment, in a preferred embodiment, two connecting shafts 3014 are symmetrically arranged on the second end of the first body 3011 at intervals, the length of the connecting shaft 3014 is less than the length of the first shaft 3012, the second fixing groove 107 is disposed on one end of the bottom cover 101, the driving structure 304 includes the support seat 3041, the lead screw 3042, the motor assembly 3043 and the screw nut assembly 3044. Wherein, two support seats 3041 are arranged at intervals, and fixed on the outer surface of one of the bottom covers 101, and the connecting hole 30411 is set on the support seat 3041; the two ends of the lead screw 3042 can be rotationally disposed inside the connecting hole 30411; the motor assembly 3043 is connected to one end of the lead screw 3042, and the motor assembly 3043 is fixed inside the second fixing groove 107 of the bottom cover 101 fixedly connected with the support seat 3041; the screw nut assembly 3044 is disposed on the lead screw 3042 and connected with it by means of a threaded fit between them, and the two sides of the screw nut assembly 3044 are rotationally connected with the connecting shaft 3014, respectively. In this embodiment, the adjustment mechanism 3 is specifically presented as that: supplying power to the motor assembly 3043 enables the motor assembly 3043 to drive the lead screw 3042 to rotate, when the lead screw 3042 drives the screw nut assembly 3044 towards the edge of the panel structure 1, the first body 3011 and the second body 3021 rotate around the main shaft 303, and the first shaft 3012 and the second shaft 3022 are in relative motion close to each other, when the lead screw 3042 drives the screw nut assembly 3044 towards the center of the panel structure 1, the first body 3011 and the second body 3021 rotate around the main shaft 303, the first shaft 3012 and the second shaft 3022 are in relative motion away from each other. In an alternative embodiment, the main shaft 303 may be integrally connected with the first body 3011 or the second body 3021, the driving structure 304 can be directly connected to the main shaft 303, so as to drive the main shaft 303 to rotate.

Figure 11:
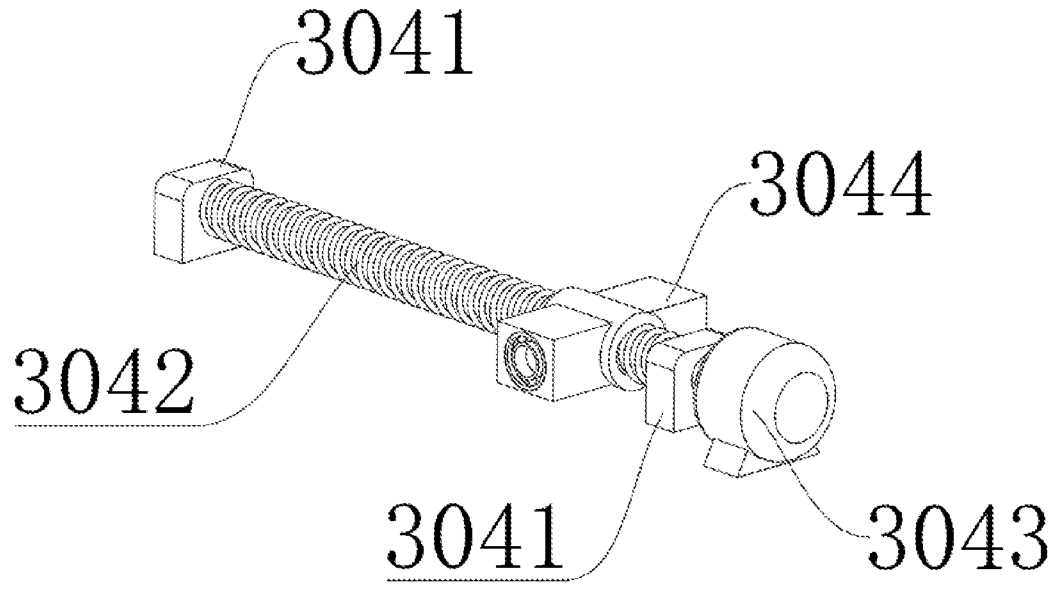
FIG. 11 is a structure diagram of the driving structure in FIG. 2.
Figure 12:
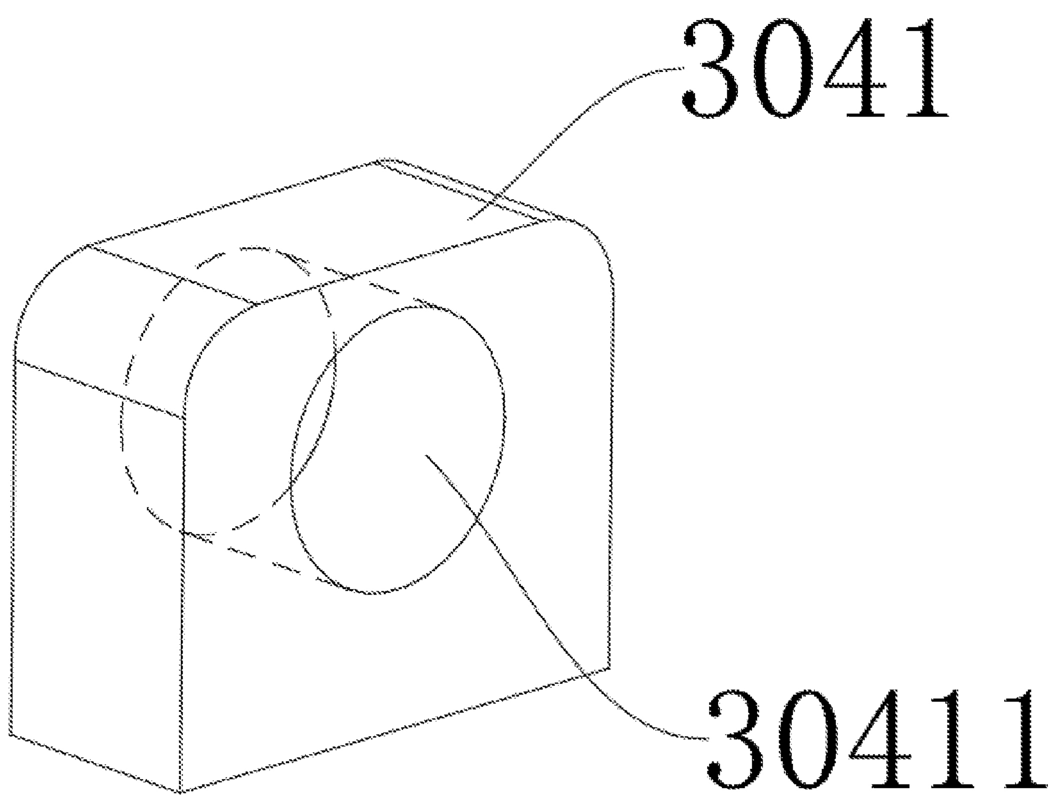
FIG. 12 is a structure diagram of the support seat in FIG. 11.
Figure 14:
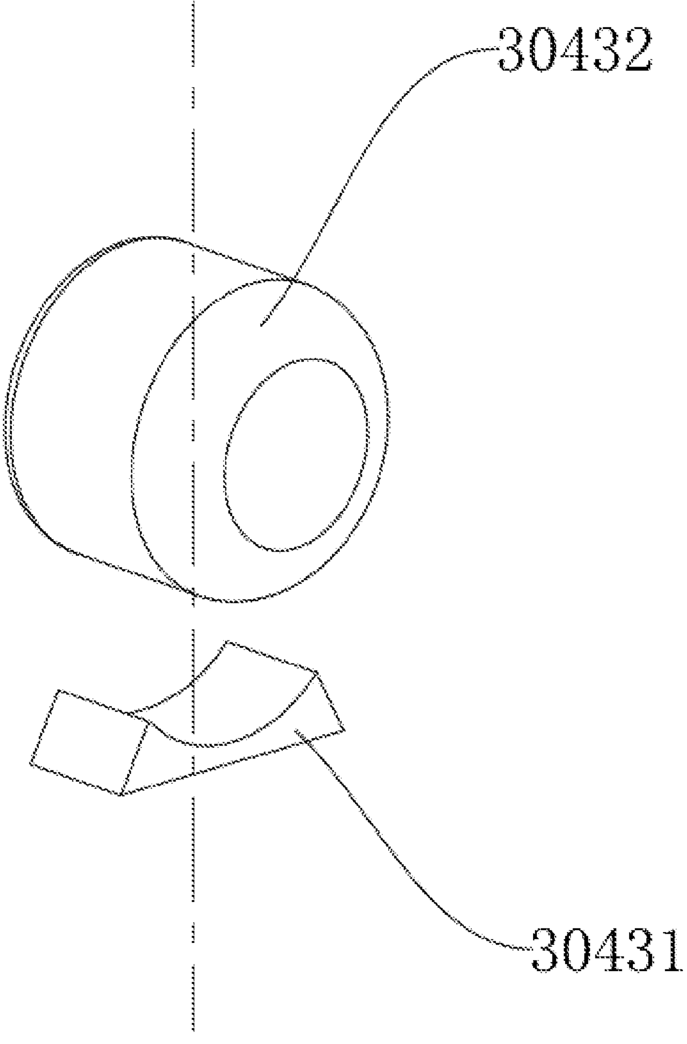
FIG. 14 is an exploded view of the motor assembly in FIG. 11.
Figure 15:
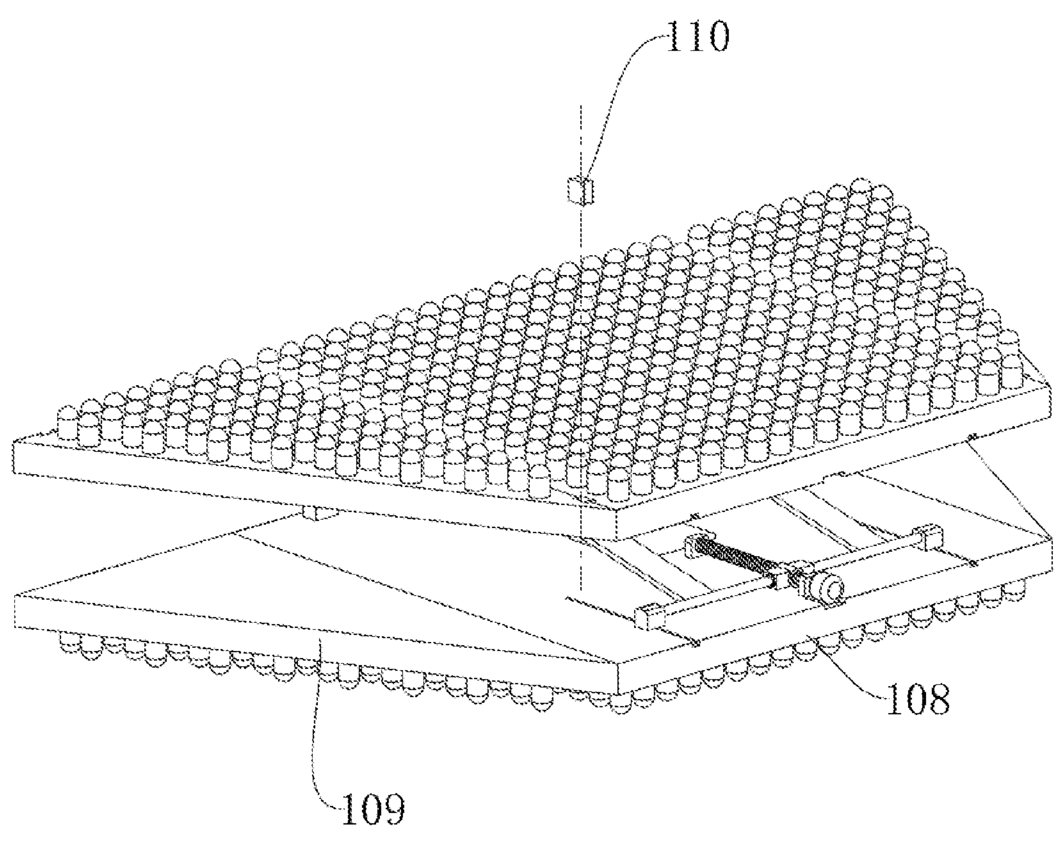
FIG. 15 is a structure diagram of the triangular extension panel connected to both sides of the main panel.
Figure 16:
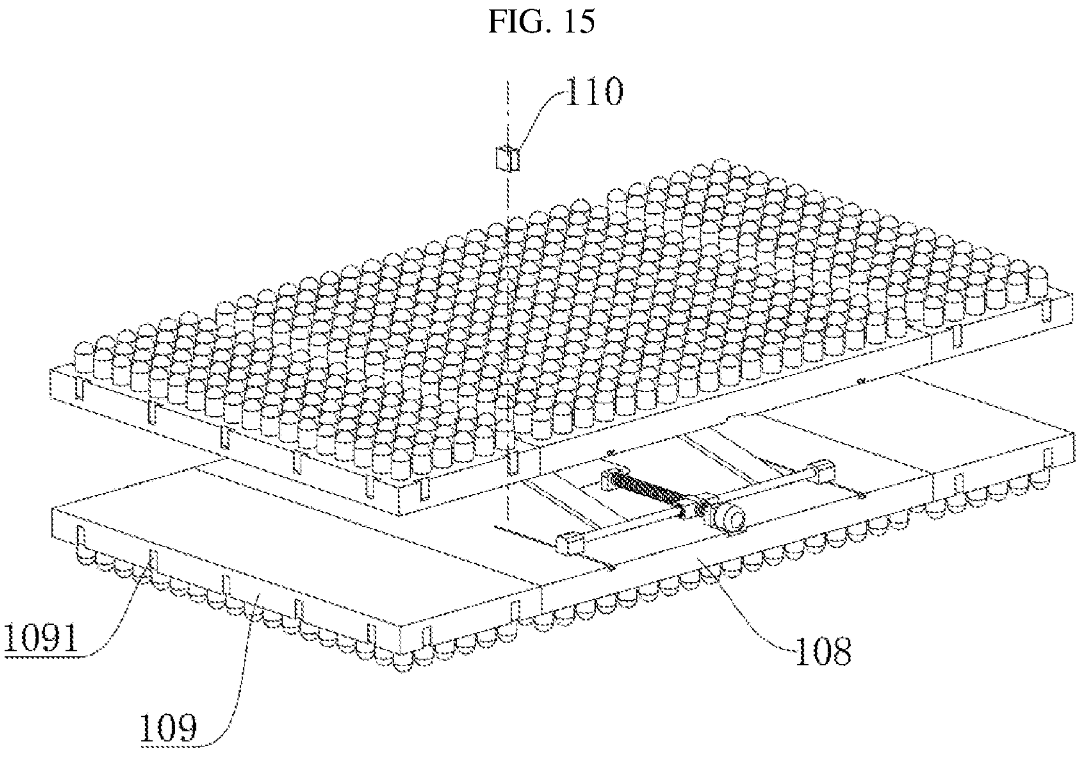
FIG. 16 is a structure diagram of the rectangular expansion panel connected to both sides of the main panel.
Figure 17:
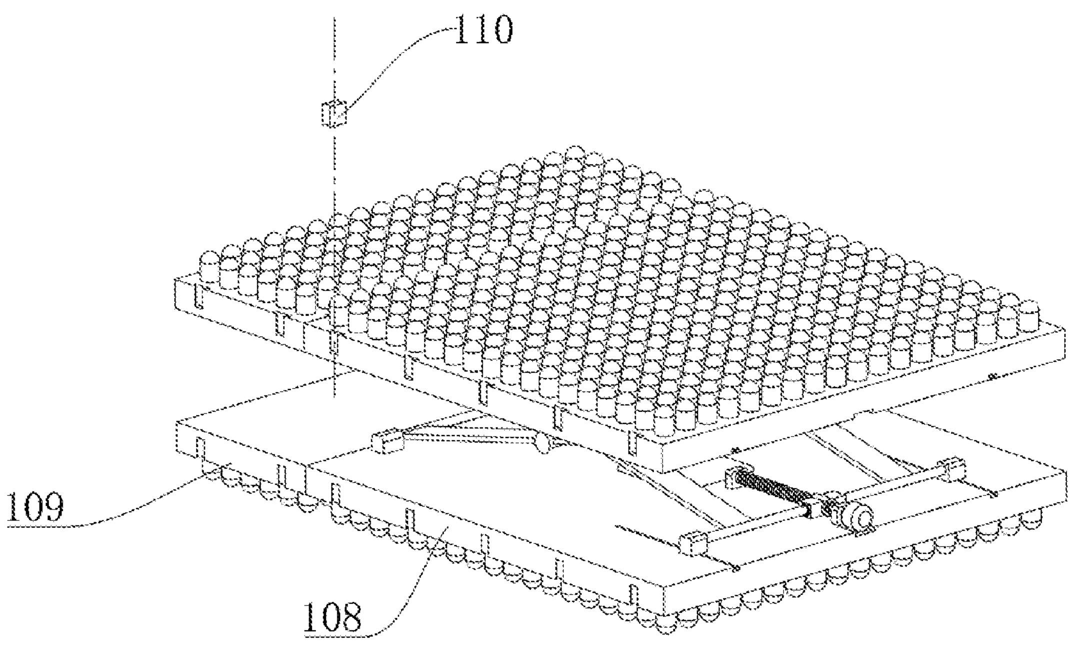
FIG. 17 is a structure diagram of the rectangular expansion panel connected to one side of the main panel.
Figure 18:
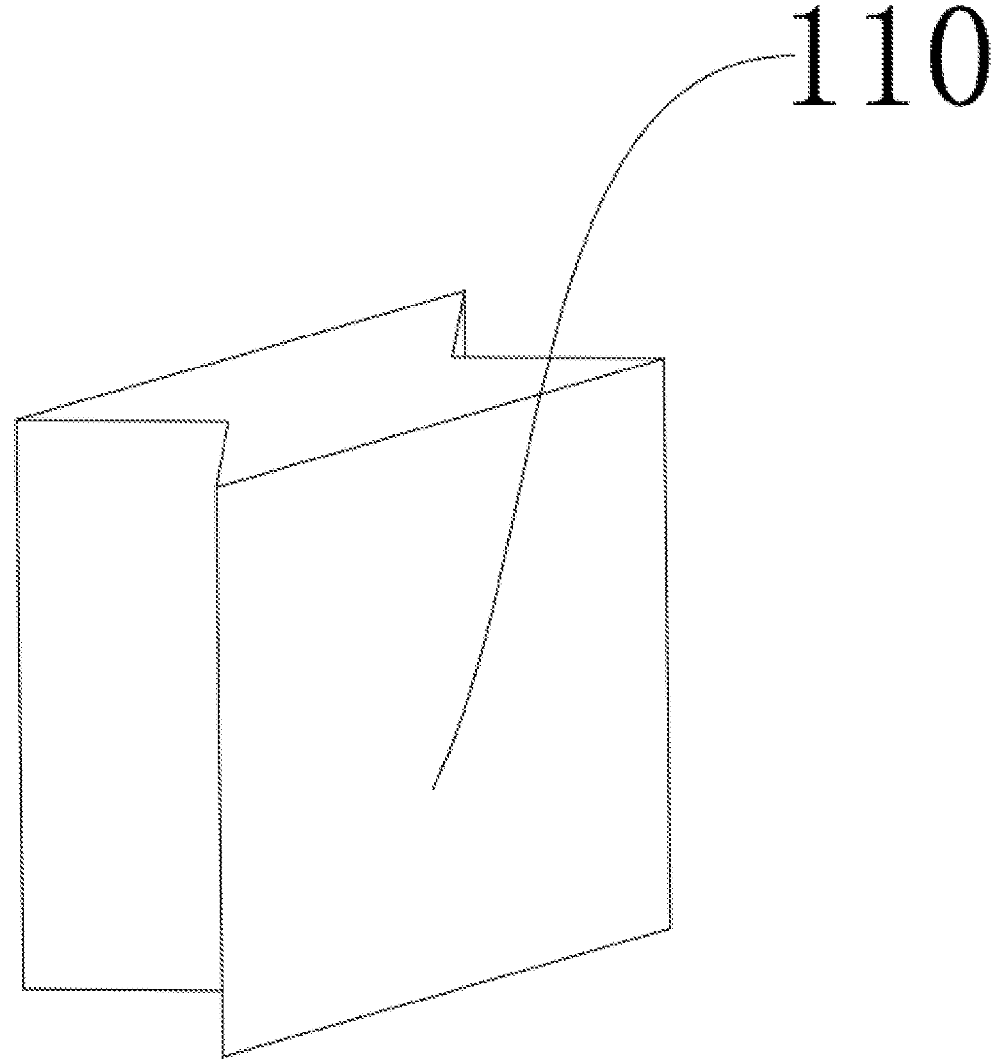
FIG. 18 is an enlarged view of the splicing connector in FIG. 15, FIG. 16 and FIG. 17.

In an embodiment, as shown in FIGS. 11 and 14, the motor assembly 3043 includes the second support seat 30431 and the motor 30432 fixedly disposed on the second support seat 30431, the motor 30432 is connected to one end of the lead screw 3042, and the lower end of the second support seat 30431 is fixedly disposed inside the second fixing groove 107. Specifically, the distance between the two panel structures 1 is clearly related to the displacement distance of the screw nut assembly 3044 and the operating time or the number of rotation cycles of the motor 30432, therefore, it can be determined according to the operating time or the number of rotation cycles of the motor 30432, when each piezoelectric material generates an electrical signal.

Figure 13:
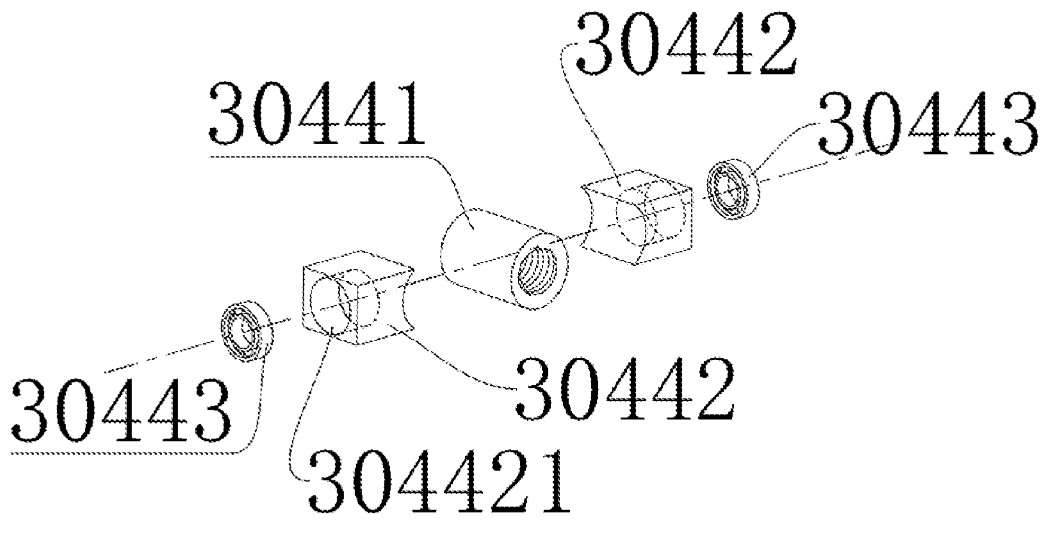
FIG. 13 is an exploded view of the screw nut assembly in FIG. 11.

On the basis of the above embodiment, in a preferred embodiment, as shown in FIG. 13, the screw nut assembly 3044 includes the ball screw nut 30441, the screw nut connector 30442 and the bearing 30443. Wherein, the screw ball nut 30441 is disposed on the lead screw 3042 by means of a thread fit between them; two screw nut connectors 30442 are symmetrically arranged on both sides of the ball screw nut 30441, one end of the screw nut connector 30442 facing the ball screw nut 30441 is a curved surface that fits the contour of the ball screw nut 30441, the ball screw nut 30441 is embedded in the curved surface and is fixedly connected to the screw nut connector 30442, and one end of the nut screw connector 30442 back-facing the ball screw nut 30441 is provided with the bearing hole 304421; the bearing 30443 is arranged in one-to-one correspondence with the screw nut connector 30442, the outer ring of the bearing 30443 is fixedly with the bearing hole 304421, and the inner ring of the bearing 30443 is fixed outside the connecting shaft 3014. In this embodiment, the assembly method for the screw nut assembly 3044 is relatively simple, and the arrangement of the bearing 30443 enables the connecting shaft 3014 to freely rotate relative to the screw nut assembly 3044, reducing friction losses between the two.

On the basis of the above embodiment, in a preferred embodiment, as shown in FIG. 9, the connecting shaft 3014 includes the first shaft segment 30141 and the second shaft segment 30142, the outer diameter of the second shaft segment 30142 is less than the outer diameter of the first shaft segment 30141, and the second shaft segment 30142 is fixedly connected with the inner ring of the bearing 30443. In this embodiment, making the outer diameter of the second shaft segment 30142 smaller than the outer diameter of the first shaft segment 30141 enables a step surface to form between the second shaft segment 30142 and the first shaft segment 30141, functioning in limiting position for the assembly of the second shaft segment 30142 and the screw nut connector 30442.

On the basis of the above embodiment, in a preferred embodiment, as shown in FIGS. 15-18, the panel structure 1 includes the main panel 108 and a plurality of expansion panels 109, the main panel 108 is rectangular, the expansion panel 109 is rectangular or triangular, the first fixing groove 104, the slideway 106 and the second fixing groove 107 are disposed on the main panel 108, the second fixing groove 107 extends to one of the side walls of the main panel 108, the first splicing notches 1081 are disposed on the other side walls of the main panel 108, the second splicing notch 1091 corresponding to the first splicing notch 1081 is disposed on the side wall of the extension panel 109, the first splicing notch 1081 and the second splicing notch 1091 are both dovetail-shaped, and aligned with each other to be symmetrically arranged with respect to their splicing face, the main panel 108 and the expansion panel 109 are connected by the splicing connector 110, which may be simultaneously embedded in the first splicing notch 1081 and the second splicing notch 1091. In this embodiment, setting the expansion panel 109 enables the area of the entire panel structure 1 to increase, so as to be suitable for measuring a larger gap, and connecting the main panel 108 with the expansion panel 109 by means of the splicing connectors 110 enables assembly and disassembly to be convenient, so that the expansion panel 109 may be selected for use on the basis of needs, so as to widen its use scope.

Example 2

This example provides a gap measurement method applied to the built-in gap measuring device provided in the above example, the gap measurement method includes the following steps:

S1. Adjusting the adjustment mechanism 3, so as to enable the distance between the two panel structures 1 to reach a minimum value. Specifically, supplying power to the motor assembly 3043 enables the motor assembly 3043 to drive the lead screw 3042 to rotate, the lead screw 3042 drives the screw nut assembly 3044 towards the edge of the panel structure 1, so that the first shaft 3012 of the first support 301 and the second shaft 3022 of the second support 302 are in relative motion close to each other, until the relative distance between the first axis 3012 and the second axis 3022 reaches the closest, the power supply to the motor 30432 stops.

S2. Embedding the built-in gap measuring device into the gap to be measured. When the distance between the two panel structures 1 reaches a minimum value, the built-in gap measuring device can be easily embedded in the gap to be measured.

S3. Adjusting the adjustment mechanism 3, so as to enable the distance between the two panel structures 1 to increase until an electrical signal is generated from each piezoelectric material 203. Specifically, supplying power to the motor assembly 3043 enables the motor assembly 3043 to drive the lead screw 3042 to rotate, rotating the lead screw 3042 to drive the screw nut assembly 3044 towards the center of the panel structure 1 enables the first shaft 3012 and the second shaft 3022 to be in relative motion away from each other, since the protruding areas exist on the gap side wall, some elastic columns 201 are squeezed due to contact with the gap side wall, at this time, the spring 202 inside the elastic column 201 is squeezed under the load, so that the piezoelectric material 203 is pressed to generate an electrical signal, the first shaft 3012 and the second shaft 3022 continue to move away from each other, the elastic column 203 is capable of contacting the dented area of the gap side wall and generates an electrical signal, until each piezoelectric material 203 generates an electrical signal; after each piezoelectric material 203 has generated an electrical signal, the signal is transmitted to the control circuit board 204, the control circuit board 204 cuts off the power supply to the motor 30432 by means of radio signals, each piezoelectric material 203 generating an electrical signal denotes that each elastic column 201 has been in contact with the gap side wall, but the spring 202 is squeezed to different degrees, correspondingly the piezoelectric material 203 generates electrical signals with different values. Therefore, the degrees of protrusion or indentation of the gap side wall and the displacement distance of the elastic column 201 arising from squeezes can be determined according to the electrical signal value generated from each piezoelectric material 203, and then the length of the elastic column 201 finally extending from the panel structure 1 can be obtained according to the length of the elastic column 201 initially extending from the panel structure 1 minus the displacement distance of the elastic column 201 arising from squeezes, next the actual width of the gap can be obtained according to the distance between the two panel structures 1 plus the thickness of the two panel structures 1 and the length value of the two opposite elastic columns 201 finally extending from the panel structure 1.

It is obvious that the above description only gives examples for clarity, which does not impose a limitation on their embodiments. A person skilled in the art can make various changes or modifications on the basis of the above description. There is no need and inability to give all exhaustive embodiments. However, the apparent changes or modifications derived therefrom still fall within the protection scope of the present disclosure.

What is claimed is:

1. A built-in gap measuring device, comprising:

an adjustment mechanism (3); and measuring mechanisms disposed on both sides of said adjustment mechanism (3), wherein said adjustment mechanism (3) can adjust the distance between two groups of said measuring mechanisms, wherein said measuring mechanism includes:

a panel structure (1), wherein:

said panel structure (1) includes a bottom cover (101) close to said adjustment mechanism (3), wherein two first support seats (105) are symmetrically arranged at one end of the outer surface of said bottom cover (101), a shaft hole (1051) is disposed on said first support seat (105), two slideways (106) are symmetrically arranged at the other end of the outer surface of said bottom cover (101), wherein one end of said slideway (106) is flush with the end of said bottom cover (101): said adjustment mechanism (3) includes a first support (301), a support (302) and a driving structure (304), wherein:

said first support (301) includes a first body (3011), a first shaft (3012) disposed at the first end of said first body (3011), and two first sliding blocks (3013) disposed at the second end of said first body (3011), said first shaft (3012) is articulated in two shaft holes (1051) on one of said bottom covers (101), and said two first sliding blocks (3013) are respectively disposed in said two slideways (106) on the other bottom cover (101);

said second support (302) includes a second body (3021), a first shaft (3022) disposed at the first end of said second body (3021), and two second sliding blocks (3023) disposed at the second end of said second body (3021), said second shaft (3022) is articulated in two shaft holes (1051) on said bottom covers (101) having said two first sliding block (3013), and said two second sliding blocks (3023) are respectively disposed in said two slideways (106) on the other bottom cover (101) articulated with said first shaft (3012), the middle part of said second body (3021) is articulated with the middle part of said first body (3011) through a main shaft (303), said first shaft (3012) and said second shaft (3022) are positioned on the same side of said main shaft (303);

said driving structure (304) is capable of driving said first support (301) and said second support (302) to rotate around said main shaft (303); and said slideway (106) is T-shaped, correspondingly, said first sliding block (3013) and said second sliding block (3023) include a T-shaped key (30131) configured to be operably received by the said slideway (106);

said panel structure (1) includes a top cover (102) away from said adjustment mechanism (3);

a plurality of rows of elastic column holes (1021) are arranged on said top cover (102) in array;

column seats (103) in one-to-one correspondence with said elastic column holes (1021) are arranged inside said panel structure (1) in array, wherein:

the first end of said column seat (103) is fixed on said bottom cover (101); and the second end of said column seat (103) is positioned inside said elastic column hole (1021) and is flush with the outer surface of said top cover (102); and a measuring column (2), wherein:

said measuring column (2) includes an elastic column (201), a spring (202), a piezoelectric material (203) and a control circuit board (204);

said elastic column (201) includes a column body (2011), a column cap (2012) and a ring seat (2013), said column body (2011) is a hollow structure and encircles the outside of said column seat (103);

said ring seat (2013) is connected to one end of said column body (2011) and is slidably set around the outside of said column seat (103), wherein:

the outer diameter of said ring seat (2013) is larger than the outer diameter of said elastic column hole (1021);

said column cap (2012) is disposed at the other end of said column body (2011);

said piezoelectric material (203) is disposed inside said column body (2011) and abuts against the second end of said column seat (103); and said spring (202) is disposed inside said column body (2011), wherein:

one end of said spring (202) abuts against said piezoelectric material (203);

the other end of said spring (202) abuts against said column cap (2012), when said elastic column (201) is not subjected to an external force; and said spring (202) is in a naturally-elongated state, and said control circuit board (204) is disposed on said panel structure (1) and electrically connected with each piezoelectric material (203).

2. The built-in gap measuring device according to claim 1, wherein a first fixing groove (104) is disposed at the center of the outer surface of said bottom cover (101), and said control circuit board (204) is embedded in said first fixed groove (104).

3. The built-in gap measuring device according to claim 1, wherein a first shaft sleeve (30111) is disposed at the middle part of said first body (3011), a second shaft sleeve (30211) is disposed at the middle part of said second body (3021), said main shaft (303) passes through said first shaft sleeve (30111) and said second shaft sleeve (30211) and its both ends are connected with an end cap (3031).

4. The built-in gap measuring device according to claim 1, wherein two connecting shafts (3014) are symmetrically arranged on the second end of said first body (3011) at intervals, the length of said connecting shaft (3014) is less than the length of said first shaft (3012), a second fixing groove (107) is disposed on one end of said bottom cover (101), said driving structure (304) includes a support seat (3041), a lead screw (3042), a motor assembly (3043) and a screw nut assembly (3044), two support seats (3041) are arranged at intervals, and fixed on the outer surface of one of said bottom covers (101), and a connecting hole (30411) is set on said support seat (3041);

the two ends of said lead screw (3042) can be rotationally disposed inside said connecting hole (30411);

said motor assembly (3043) is connected to one end of said lead screw (3042), and said motor assembly (3043) is fixed inside said second fixing groove (107) of said bottom cover (101) fixedly connected with said support seat (3041);

said screw nut assembly (3044) is disposed on said lead screw (3042) and connected with it by means of a threaded fit between them, and the two sides of said screw nut assembly (3044) are rotationally connected with said connecting shaft (3014), respectively.

5. The built-in gap measuring device according to claim 4, wherein said screw nut assembly (3044) includes a ball screw nut (30441), a screw nut connector (30442) and a bearing (30443), said screw ball nut (30441) is disposed on said lead screw (3042) by means of a thread fit between them;

two screw nut connectors (30442) are symmetrically arranged on both sides of said ball screw nut (30441), one end of said screw nut connector (30442) facing said ball screw nut (30441) is a curved surface that fits the contour of said ball screw nut (30441), said ball screw nut (30441) is embedded in the curved surface and is fixedly connected to said screw nut connector (30442), and one end of said nut screw connector (30442) back-facing said ball screw nut (30441) is provided with a bearing hole (304421);

said bearing (30443) is arranged in one-to-one correspondence with said screw nut connector (30442), the outer ring of said bearing (30443) is fixedly with said bearing hole (304421), and the inner ring of said bearing (30443) is fixed outside said connecting shaft (3014).

6. The built-in gap measuring device according to claim 5, wherein said connecting shaft (3014) includes a first shaft segment (30141) and a second shaft segment (30142), the outer diameter of said second shaft segment (30142) is less than the outer diameter of said first shaft segment (30141), and said second shaft segment (30142) is fixedly connected with the inner ring of said bearing (30443).

7. The built-in gap measuring device according to claim 4, wherein said panel structure (1) comprises a main panel (108) and a plurality of expansion panels (109), said main panel (108) is rectangular, said expansion panel (109) is rectangular or triangular, said measuring column (2) is disposed on each of said main panel (108) and said expansion panel (109), said slideway (106) is disposed on said main panel (108), said second fixing groove (107) extends to one of the side walls of said main panel (108), first splicing notches (1081) are disposed on the other side walls of said main panel (108), a second splicing notch (1091) corresponding to said first splicing notch (1081) is disposed on the side wall of said extension panel (109), said first splicing notch (1081) and said second splicing notch (1091) are both dovetail-shaped, and aligned with each other to be symmetrically arranged with respect to their splicing face, said main panel (108) and said expansion panel (109) are connected by a splicing connector (110), which may be simultaneously embedded in said first splicing notch (1081) and said second splicing notch (1091).

8. A gap measurement method applied to the built-in gap measuring device as claimed in claim 1, comprising the steps of S1. adjusting said adjustment mechanism (3), so as to enable the distance between said two panel structures (1) to reach a minimum value;

S2. embedding the built-in gap measuring device into the gap to be measured; and S3. adjusting said adjustment mechanism (3), so as to enable the distance between said two panel structures (1) to increase until an electrical signal is generated from each said piezoelectric material (203).

9. The gap measurement method applied to the built-in gap measuring device of claim 8, wherein a first fixing groove (104) is disposed at the center of the outer surface of said bottom cover (101), and said control circuit board (204) is embedded in said first fixed groove (104).

10. The gap measurement method applied to the built-in gap measuring device of claim 8, wherein two first support seats (105) are symmetrically arranged at one end of the outer surface of said bottom cover (101), a shaft hole (1051) is disposed on said first support seat (105), two slideways (106) are symmetrically arranged at the other end of the outer surface of said bottom cover (101), said adjustment mechanism (3) includes a first support (301), a support (302) and a driving structure (304), said first support (301) includes a first body (3011), a first shaft (3012) disposed at the first end of said first body (3011), and two first sliding blocks (3013) disposed at the second end of said first body (3011), said first shaft (3012) is articulated in two shaft holes (1051) on one of said bottom covers (101), and said two first sliding blocks (3013) are respectively disposed in said two slideways (106) on the other bottom cover (101);

said second support (302) includes a second body (3021), a first shaft (3022) disposed at the first end of said second body (3021), and two second sliding blocks (3023) disposed at the second end of said second body (3021), said second shaft (3022) is articulated in two shaft holes (1051) on said bottom covers (101) having said first sliding block (3013), and said two second sliding blocks (3023) are respectively disposed in said two slideways (106) on the other bottom cover (101) articulated with said first shaft (3012), the middle part of said second body (3021) is articulated with the middle part of said first body (3011) through a main shaft (303), said first shaft (3012) and said second shaft (3022) are positioned on the same side of said main shaft (303);

said driving structure (304) is capable of driving said first support (301) and said second support (302) to rotate around said main shaft (303).

11. The gap measurement method applied to the built-in gap measuring device of claim 10, wherein one end of said slideway (106) is flush with the end of said bottom cover (101), said slideway (106) is T-shaped, correspondingly, said first sliding block (3013) and said second sliding block (3023) include a T-shaped key (30131).

12. The gap measurement method applied to the built-in gap measuring device of claim 10, wherein a first shaft sleeve (30111) is disposed at the middle part of said first body (3011), a second shaft sleeve (30211) is disposed at the middle part of said second body (3021), said main shaft (303) passes through said first shaft sleeve (30111) and said second shaft sleeve (30211) and its both ends are connected with an end cap (3031).

13. The gap measurement method applied to the built-in gap measuring device of claim 10, wherein two connecting shafts (3014) are symmetrically arranged on the second end of said first body (3011) at intervals, the length of said connecting shaft (3014) is less than the length of said first shaft (3012), a second fixing groove (107) is disposed on one end of said bottom cover (101), said driving structure (304) includes a support seat (3041), a lead screw (3042), a motor assembly (3043) and a screw nut assembly (3044), two support seats (3041) are arranged at intervals, and fixed on the outer surface of one of said bottom covers (101), and a connecting hole (30411) is set on said support seat (3041);

the two ends of said lead screw (3042) can be rotationally disposed inside said connecting hole (30411);

said motor assembly (3043) is connected to one end of said lead screw (3042), and said motor assembly (3043) is fixed inside said second fixing groove (107) of said bottom cover (101) fixedly connected with said support seat (3041);

said screw nut assembly (3044) is disposed on said lead screw (3042) and connected with it by means of a threaded fit between them, and the two sides of said screw nut assembly (3044) are rotationally connected with said connecting shaft (3014), respectively.

14. The gap measurement method applied to the built-in gap measuring device of claim 13, wherein said screw nut assembly (3044) includes a ball screw nut (30441), a screw nut connector (30442) and a bearing (30443), said screw ball nut (30441) is disposed on said lead screw (3042) by means of a thread fit between them;

two screw nut connectors (30442) are symmetrically arranged on both sides of said ball screw nut (30441), one end of said screw nut connector (30442) facing said ball screw nut (30441) is a curved surface that fits the contour of said ball screw nut (30441), said ball screw nut (30441) is embedded in the curved surface and is fixedly connected to said screw nut connector (30442), and one end of said nut screw connector (30442) back-facing said ball screw nut (30441) is provided with a bearing hole (304421);

said bearing (30443) is arranged in one-to-one correspondence with said screw nut connector (30442), the outer ring of said bearing (30443) is fixedly with said bearing hole (304421), and the inner ring of said bearing (30443) is fixed outside said connecting shaft (3014).

15. The gap measurement method applied to the built-in gap measuring device of claim 14, wherein said connecting shaft (3014) includes a first shaft segment (30141) and a second shaft segment (30142), the outer diameter of said second shaft segment (30142) is less than the outer diameter of said first shaft segment (30141), and said second shaft segment (30142) is fixedly connected with the inner ring of said bearing (30443).

16. The gap measurement method applied to the built-in gap measuring device of claim 14, wherein said panel structure (1) comprises a main panel (108) and a plurality of expansion panels (109), said main panel (108) is rectangular, said expansion panel (109) is rectangular or triangular, said measuring column (2) is disposed on each of said main panel (108) and said expansion panel (109), said slideway (106) is disposed on said main panel (108), said second fixing groove (107) extends to one of the side walls of said main panel (108), first splicing notches (1081) are disposed on the other side walls of said main panel (108), a second splicing notch (1091) corresponding to said first splicing notch (1081) is disposed on the side wall of said extension panel (109), said first splicing notch (1081) and said second splicing notch (1091) are both dovetail-shaped, and aligned with each other to be symmetrically arranged with respect to their splicing face, said main panel (108) and said expansion panel (109) are connected by a splicing connector (110), which may be simultaneously embedded in said first splicing notch (1081) and said second splicing notch (1091).

* * * * *